United States Patent
Riedisser et al.

(10) Patent No.: US 9,766,876 B2
(45) Date of Patent: Sep. 19, 2017

(54) METHODS OF UPDATING SOFTWARE COMPONENTS, COMPUTER SYSTEMS AND MEMORY APPARATUS

(71) Applicant: Fujitsu Technology Solutions Intellectual Property GmbH, München (DE)

(72) Inventors: Jochen Riedisser, Augsburg (DE); Gerold Scheidler, Bad Wünnenberg (DE)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/707,038

(22) Filed: May 8, 2015

(65) Prior Publication Data

US 2016/0291958 A1    Oct. 6, 2016

(30) Foreign Application Priority Data

Mar. 31, 2015   (DE) .............. 20 2015 101 633.6

(51) Int. Cl.
  *G06F 9/44*   (2006.01)
  *G06F 9/445*  (2006.01)
  *G06F 9/48*   (2006.01)

(52) U.S. Cl.
  CPC .............. *G06F 8/65* (2013.01); *G06F 8/68* (2013.01); *G06F 8/71* (2013.01); *G06F 9/4843* (2013.01)

(58) Field of Classification Search
  None
  See application file for complete search history.

(56) References Cited

U.S. PATENT DOCUMENTS

| 7,484,084 B1 | 1/2009 | Ranaweera et al. |
| 8,260,841 B1 | 9/2012 | Maity |
| 2002/0092008 A1 | 7/2002 | Kehne et al. |
| 2004/0093592 A1* | 5/2004 | Rao ............ G06F 8/65 717/168 |
| 2004/0205779 A1 | 10/2004 | Almeida et al. |

(Continued)

FOREIGN PATENT DOCUMENTS

| JP | 2001075786 A | 3/2001 |
| JP | 2003173260 A | 6/2003 |

(Continued)

OTHER PUBLICATIONS

USPTO, [Paulino], Advisory Action mailed Mar. 7, 2017 in related U.S. Appl. No. 14/713,017.

(Continued)

*Primary Examiner* — Qamrun Nahar
(74) *Attorney, Agent, or Firm* — Fujitsu Patent Center

(57) ABSTRACT

A method of updating software components of a computer system includes downloading a plurality of update packages from at least one predetermined network source by a service processor of the computer system, which service processor can be operated independently of a main processor and an operating system of the computer system; compiling the downloaded update packages to form a data volume; establishing a data connection between an agent service executed under control of the operating system and the compiled data volume; and updating software components on the basis of the plurality of update packages in the compiled data volume by the agent service.

16 Claims, 4 Drawing Sheets

(56) References Cited

U.S. PATENT DOCUMENTS

| | | | |
|---|---|---|---|
| 2008/0077711 | A1 | 3/2008 | Cepulis |
| 2010/0250825 | A1 | 9/2010 | Chen et al. |
| 2011/0197055 | A1 | 8/2011 | Spottswood et al. |
| 2013/0007437 | A1 | 1/2013 | Shroni et al. |
| 2014/0337004 | A1 | 11/2014 | Maity et al. |
| 2015/0149815 | A1 | 5/2015 | Maity et al. |
| 2015/0178096 | A1 | 6/2015 | Inbaraj |
| 2015/0373038 | A1* | 12/2015 | Blackwell ............ G06F 21/554 726/23 |

FOREIGN PATENT DOCUMENTS

| | | |
|---|---|---|
| JP | 2011070674 A | 4/2011 |
| JP | 2012053869 A | 3/2012 |
| JP | 2014093075 A | 5/2014 |
| JP | 2015-60411 A | 3/2015 |

OTHER PUBLICATIONS

USPTO, [Paulino], Final Rejection mailed Dec. 14, 2016 in related U.S. Appl. No. 14/713,017.
USPTO, [Paulino], Non-Final Rejection mailed Jun. 16, 2016 in related U.S. Appl. No. 14/713,017.
USPTO, [Paulina] Non-Final Office Action dated Jun. 14, 2017 in related U.S. Appl. No. 14/713,017, 34 pages.

* cited by examiner

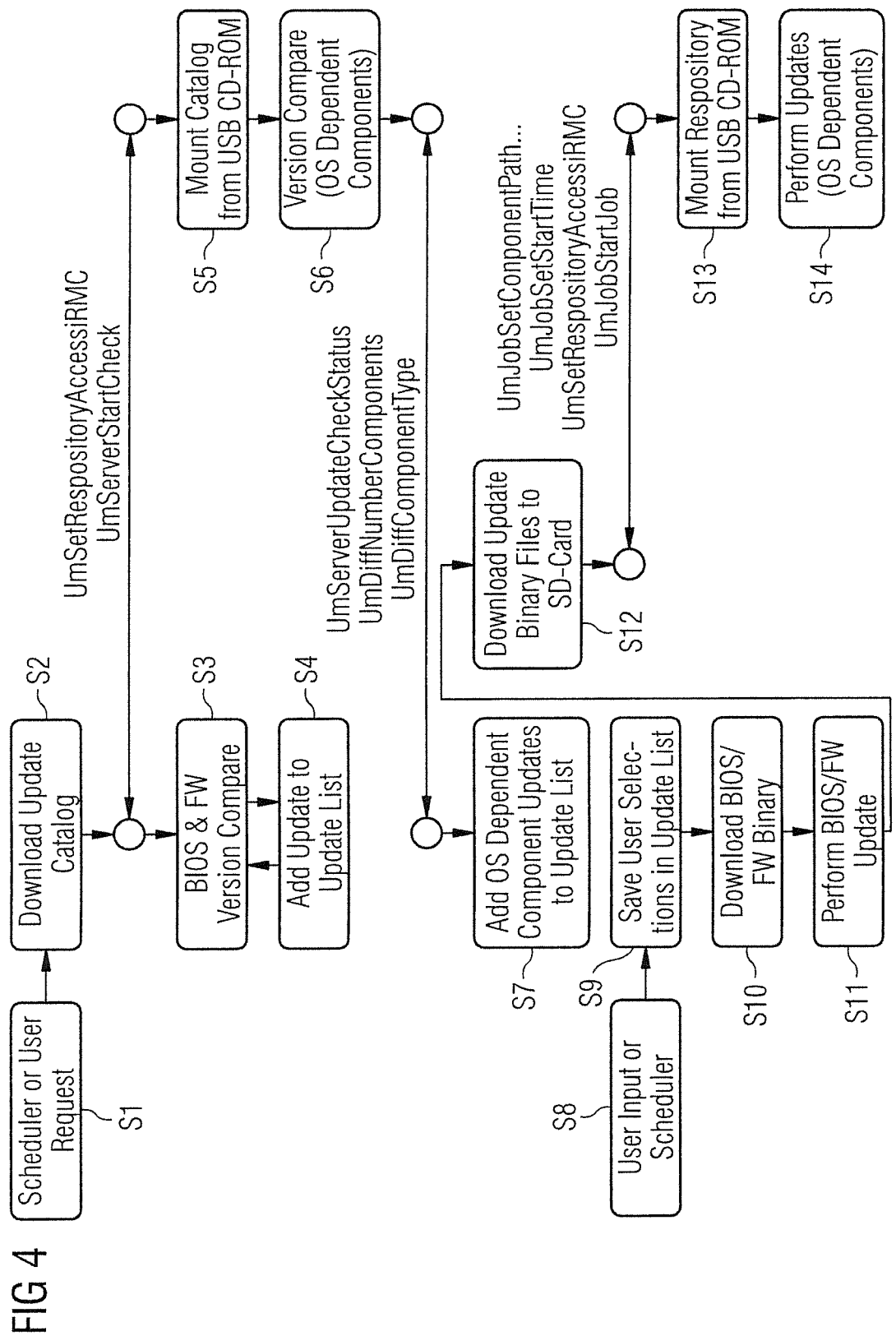

METHODS OF UPDATING SOFTWARE COMPONENTS, COMPUTER SYSTEMS AND MEMORY APPARATUS

TECHNICAL FIELD

This disclosure relates to methods of updating software components of a computer system in which a plurality of update packages are downloaded from at least one predetermined network source and used to update software components of the computer system. The disclosure also relates to computer systems and memory apparatus having executable program code stored thereon to carry out such methods.

BACKGROUND

Methods of updating software components of a computer system are widely known. As a result of the continuously increasing complexity of computer systems and software components running on the latter, there is a high demand for software components to be updated. Updating the software components closes newly discovered security gaps or extends the functionality of the software components, for example.

The software components may be parts of application software or of an operating system, software components close to the hardware such as driver software in particular, or so-called firmware components stored in a non-volatile memory of a hardware component itself.

Virtually every manufacturer of software components provides for updating the software components provided by the manufacturer. For example, manufacturers of hardware components usually provide so-called flash programs to update a programmable flash memory with an updated firmware version. Manufacturers of drivers, operating systems and/or application programs generally provide utilities to update individual software components or a plurality of software components of the programs produced by the manufacturers.

As a result of the multiplicity of software components contained in a computer system, on the one hand, and the increasing frequency with which the software components are updated, on the other hand, the effort needed to maintain a computer system, in particular updating the software components installed thereon, is continuously increasing. This is disruptive, in particular, in server computers that generally operate without interruption and are therefore available for maintenance work only to a limited extent. In addition, the manual loading of update packages by an administrator or user of a computer system takes a long time.

Therefore, there is a need for methods and apparatuses that simplify updating software components of a computer system. A potential solution should preferably assist in reducing both the workload of an administrator and the system load of the computer system itself.

SUMMARY

We provide a method of updating software components of a computer system including downloading a plurality of update packages from at least one predetermined network source by a service processor of the computer system, which service processor can be operated independently of a main processor and an operating system of the computer system; compiling the downloaded update packages to form a data volume; establishing a data connection between an agent service executed under control of the operating system and the compiled data volume; and updating software components on the basis of the plurality of update packages in the compiled data volume by the agent service.

We also provide a computer system including a main processor that executes an operating system and an agent service running in the latter; and a service processor that can be operated independently of the main processor and the operating system, wherein the service processor is configured to load a plurality of update packages for the computer system from at least one predetermined network source and compile them to form a data volume; and the agent service is configured to establish a data connection to the compiled data volume and update software components of the computer system on the basis of the plurality of update packages in the compiled data volume.

We further provide a memory apparatus having executable program code stored thereon, at least the following steps being carried out by a service processor of a computer system when the program code is being executed by the service processor; downloading a plurality of update packages from at least one predetermined network source independently of a main processor and an operating system of the computer system; compiling the downloaded update packages to form a data volume; and emulating a standard interface to access the data volume by an agent service running under the control of the operating system.

BRIEF DESCRIPTION OF THE DRAWINGS

FIG. 4 shows a flowchart of a method of updating software components.

LIST OF REFERENCE SYMBOLS

Figure 1:
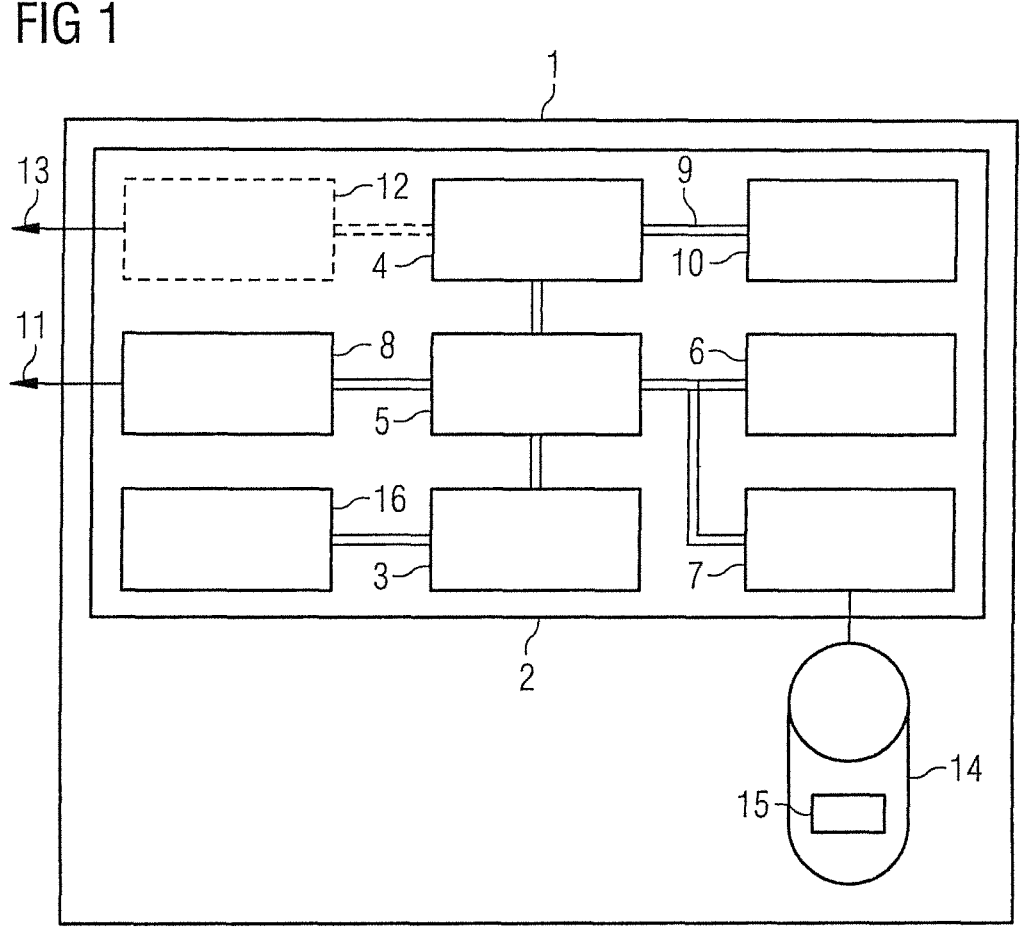
FIG. 1 shows a schematic illustration of an example of our computer systems.

1 Computer system
2 System component
3 Main processor
4 Service processor
5 Chipset
6 Basic input output system (BIOS)
7 Input/output controller
8 (First) network controller
9 Connection
10 Memory card
11 Data network
12 (Second) network controller
13 Management network
14 Mass memory drive
15 Operating system
16 Main memory
20 Application framework library
21 XML library
22 Database library
23 Virtual storage media library
24 IPMI library
25 Network interface
26 Communication interface
27 PCIe interface
28 Agent service
29 System monitoring component
30 RAID manager 31 Update manager
32 Installation manager
33 File system
34 Data volume (image of a first date storage medium)
35 Data volume (image of a second data storage medium)
36 Data volume (image of a bootable data storage medium)
37 Inventory list
38 Graphical user interface
40 Update package
41 Update server
42 Configuration interface
43 Update service
44 Version comparison component
45 Configuration database (of the operating system)
46 Update controller
47 Loading component
48 Update component
S1-S14 Method steps

DETAILED DESCRIPTION

We provide a method of updating software components of a computer system. The method comprises:
  downloading a plurality of update packages from at least one predetermined network source by a service processor of the computer system, which service processor can be operated independently of a main processor and an operating system of the computer system,
  compiling the downloaded update packages to form a data volume,
  establishing a data connection between an agent service executed under the control of the operating system and the compiled data volume, and
  updating software components on the basis of the plurality of update packages in the compiled data volume by the agent service.

According to that method, the effort needed to update the computer system is divided between a service processor and an agent service running under an operating system of the computer system. In particular, the service processor carries out the often time-consuming downloading of the update packages from at least one network source and compiles them for the agent service. In the meantime, the operating system of the computer system can continue to run without disruption and without additionally loading its main processor. After the plurality of update packages have been compiled to form a data volume, the agent service updates the software components in question under the control of the operating system. This makes it possible to carry out a multiplicity of updates together and automatically if necessary. In this case, software components of the operating system can be indirectly updated by the service processor by providing the agent service.

The method may additionally comprise downloading a first list containing available update packages from an update server by the service processor, the first list containing meta data relating to the available update packages. The meta data contained in the first list are compared to corresponding meta data relating to software components installed on the computer system. A second list containing software components contained in the computer system and need to be updated is then created on the basis of the comparison. The service processor downloads the update packages according to the second list.

Alternatively, software components installed in the computer system may first be determined. A list of the software components determined may then be created, the first list containing meta data relating to the software components determined, and update packages downloaded from an update server on the basis of the created list.

As a result of a procedure according to one of these examples, it is possible to determine, prior to the update, those software components of the computer system for which an update is available on the basis of corresponding meta data. Only such update packages are then downloaded by the service processor and compiled to form the data volume. The meta data may be, for example, unique names of the software components, version information, or a last update date.

Compiling the data volume may comprise creating an image of a virtual storage medium in a memory connected to the service processor and incorporating the created image as a virtual memory drive in the operating system. Incorporating the data volume as a storage medium of a virtual memory drive makes it possible for the operating system to access the update packages as if they were stored on a local drive of the computer system. Therefore, there is no need to provide further software components on the side of the operating system for accessing the update packages.

At least one of the downloading, compiling, establishing and updating steps may be initiated by a scheduling component of the service processor. Such a procedure makes it possible to ensure regular, automatic updating of the computer system.

The method described can be used to update application software components, operating system components, driver software components and/or firmware components of the computer system.

We also provide computer systems. The computer systems may comprise a main processor that executes an operating system and an agent service running in the latter. The computer systems may also comprise a service processor that can be operated independently of the main processor and the operating system. In this case, the service processor is set up to load a plurality of update packages for the computer system and to compile them to form a data volume, and the agent service is set up to establish a data connection to the compiled data volume and to update software components of the computer system on the basis of the plurality of update packages in the compiled data volume.

The computer systems substantially make it possible to carry out the methods.

The computer systems may comprise at least one first memory apparatus that stores the operating system and at least one second memory apparatus that can be operated independently of the first memory apparatus, is coupled to the service processor and intended to store the data volume. Providing a second memory apparatus coupled to the service processor makes it possible to avoid a negative influence by a first memory apparatus, in particular a memory apparatus that stores the operating system of the computer system, during downloading. In addition, downloading is also possible when the service processor does not have access to the first memory apparatus or the latter is disconnected.

The service processor may be set up to store an image of a storage medium in the second memory apparatus and provide the stored image as a storage medium for the operating system, which storage medium may be inserted into a virtual memory drive.

For example, the stored image may be provided as a data storage medium of a virtual memory drive with a read-only operating mode, in particular of a CD or DVD drive. Providing the data volume as a storage medium of a virtual CD or DVD drive enables simple, standard-compliant integration of the data volume into the operating system. In addition, the integrity of the data volume is ensured by the associated read-only operating mode.

The second memory apparatus may be a non-volatile mass memory. For example, a flash memory module permanently connected to the computer system or an exchangeable flash memory card can be used as the second memory apparatus. Such memory apparatuses are comparatively cost-effective and can be arranged in a simple manner on a system board of the computer system.

We further provide a memory apparatus having executable program code stored thereon, at least the following steps being carried out by a service processor of a computer system when the program code is being executed by the service processor:
 downloading a plurality of update packages independently of a main processor and an operating system of the computer system,
 compiling the downloaded update packages to form a data volume, and
 emulating a standard interface to access the data volume by an agent service running under the control of the operating system.

The executable program code of the memory apparatus may be used, in particular, to program a service processor to carry out the methods and to set up the computer systems.

Further advantages are disclosed in the following description of examples.

FIG. 1 shows an example of a computer system 1. In particular, the computer system 1 according to FIG. 1 is a so-called server computer as used in computing centers, for example. The computer system 1 comprises a system component 2 having a plurality of components installed thereon. For example, the system component 2 is a motherboard of the computer system 1.

In the example, a main processor 3 and a service processor 4 are arranged on the system component 2. The main processor 3 is, for example, a powerful microprocessor from Intel, for example, an Intel® Xeon® processor. The service processor 4 is, for example, a so-called intelligent remote management controller (iRMC). Such service processors are also sometimes known as baseboard management controllers (BMC). The service processor 4 is used, inter alia, to monitor correct operation of the computer system 1 and carry out remote maintenance tasks independently of the main processor 3. For example, the computer system 1 can be switched on or off via a management network using the service processor 4.

The main processor 3 and the service processor 4 connect to further components of the computer system 1 via one or more bus systems or coupling elements. In the example, a chipset 5 is used to connect the main processor 3 and the service processor 4 to a memory module for a basic input output system, BIOS, 6, to an input/output controller 7 and to a network controller 8.

The service processor 4 also connects to a memory card 10 via a dedicated connection 9. This memory card is a so-called microSD flash memory card according to the SDHC industrial standard from the SD card association. Alternatively, it is also possible to use a so-called eMMC card or another non-volatile storage medium, for example, a flash memory permanently connected to the system component. The memory card 10 is used for the non-volatile storage of comprehensive data relating to the service processor 4, for example, in the amount of 16 GB.

The network controller 8 of the computer system 1 connects to a data network 11, for example, a local Ethernet company network. In addition, the service processor 4 connects to the same data network 11 or a separate management network 13 either via a further, optional network controller 12 or via the chipset 5 and the network controller 8. The management network 13 may also be, for example, a virtual network based on the same physical network as the data network 11.

The computer system 1 also comprises a mass memory drive 14 connected to the input/output controller 7. The mass memory drive 14 stores, in particular, an operating system 15 for the computer system 1. The operating system 15 is a so-called host operating system, for example, Microsoft Windows Server 2012, under which useful applications of the computer system 1 run.

In addition, the computer system 1 comprises a main memory 16 into which program code and associated data are loaded for processing by the main processor 3. Further components of the computer system 1, for example, a power supply, are not illustrated in FIG. 1 for reasons of clarity.

For better understanding, the important components of the hardware and software architecture of the service processor 4 are described below in FIG. 2.

The service processor 4 is used to maintain the computer system 1 during different phases, for example, when the computer system is being set up for the first time and is being updated. The central component of its firmware is a so-called application framework library 20 which provides various runtime services for software components running on the service processor 4 via a service operating system (not illustrated in FIG. 2). Distribution of the free operating system Linux, which runs independently of the operating system 15 of the main processor 3, runs on the service processor 4, which distribution is adapted to embedded systems. Individual software modules can centrally access different resources of the service processor 4 using the application framework library 20. A plurality of libraries 21 to 24 are available for this purpose. The application framework library 20 allows, inter alia, access to an XML library 21, a database library 22, a virtual storage media library 23 and an IPMI library 24 for system management. Settings of the BIOS 6 can be read or changed via the IPMI library 24, for example.

The application framework library 20 also allows access to the management network 13 via a network interface 25. Access via the network interface 25 can take place, for example, using the known HTTP or FTP protocols. The network interface 25 is used, for example, to download comprehensive data from an update server, as described below. In addition, the application framework library 20 provides a communication interface 26 between the service processor 4 and an agent service 28 via a PCIe interface 27. The communication interface 26 may be, for example, the so-called ServerView Common Command Interface (SCCI) used to interchange manufacturer-specific commands for platform management. The communication interface 26 or the physical PCIe interface 27 can be used, in particular, to interchange comprehensive data between the service processor 4 and the memory card 10 connected to the latter and the agent service 28 running on the main processor 3, as is described in detail below. Furthermore, for the BIOS 6, the PCIe interface 27 can be used to emulate a USB boot apparatus which can be used to alternatively start the computer system 1. Both the communication interface 26 and the USB connection are implemented in the form of logical, so-called memory mapped IO interfaces. In this case, the data required for them are physically interchanged via the PCIe interface 27.

The agent service 28 is a comparatively small software component which runs under the control of the operating system 15, for example, as a local service or daemon process. Since the agent service 28 itself replaces the provision of further hardware-specific or service-specific software components, for example, driver components to program individual firmware components, it is occasionally also referred to as an "agentless service."

Figure 2:
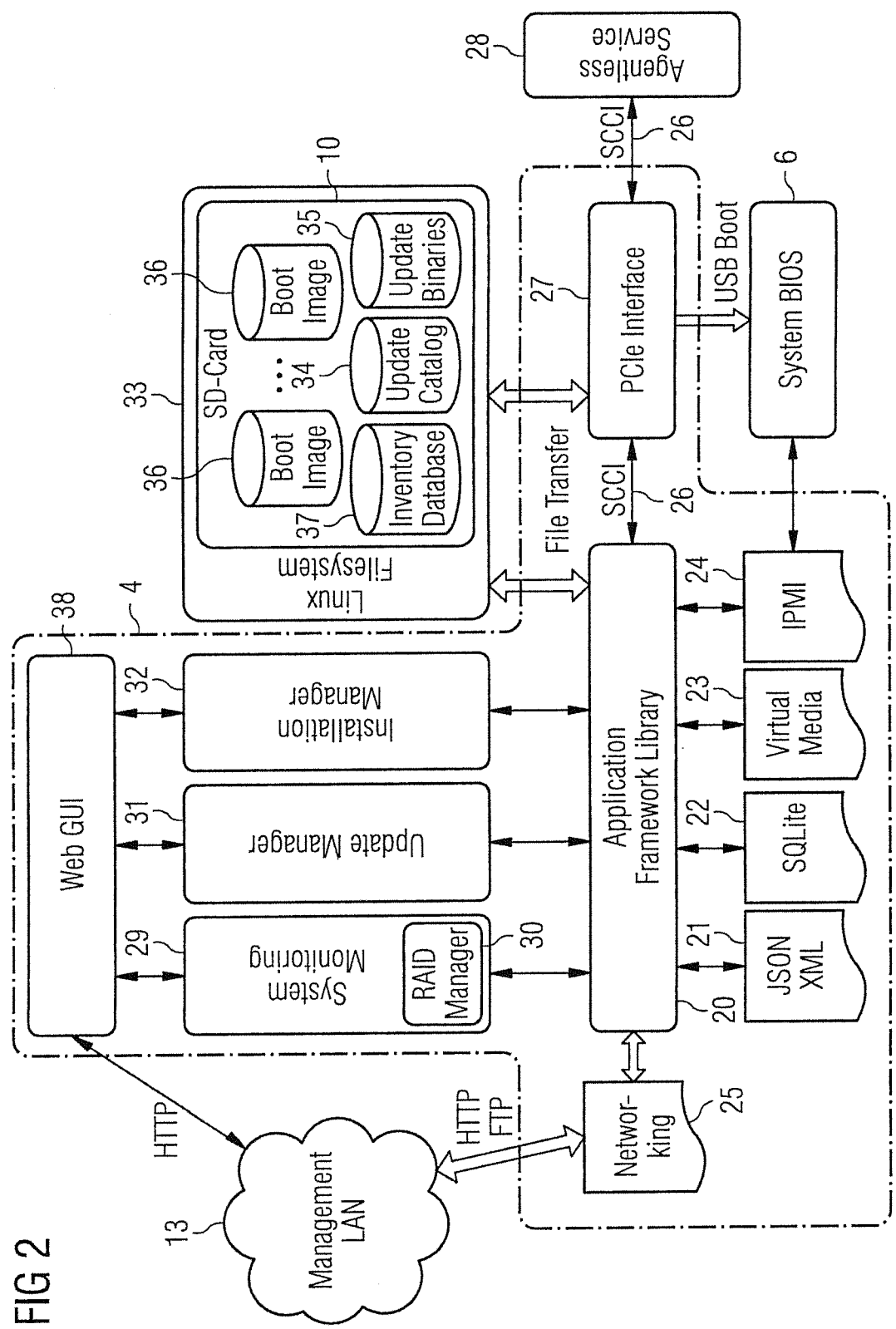
FIG. 2 shows a schematic illustration of components of a service processor.

In the example illustrated in FIG. 2, three different software components of the service processor 4 access the application framework library 20. A first component 29 is used, in particular, to carry out system monitoring. It comprises, inter alia, a RAID manager 30 to manage and monitor storage media. A second component in the form of an update manager 31 is responsible for providing update packages ("updates"). A further component in the form of an installation manager 32 is used to install update packages provided by the update manager 31.

The components 29 to 32 and other software components of the service processor 4 can access a file system 33 of the memory card 10 using the application framework library 20. The memory card 10 stores different data volumes 34, 35 and 36. In this context, a data volume is understood as meaning data or files are stored in a logically contiguous manner. This is, for example, a data storage medium volume of the memory card 10, a file containing an image of a virtual data storage medium or an archive containing related files. The data volumes 34 and 35 are images of a first virtual data storage medium having an update catalogue or of a second virtual data storage medium having update packages stored therein. The data volumes 36 are images of different bootable, virtual data storage media, for example, the images of bootable CDs or DVDs. The memory card 10 also stores an inventory list 37 or database containing inventory information relating to the computer system 1. The inventory list 37 contains information relating to each component installed in the computer system 1 and additionally information relating to the installed software or firmware of these components.

The software components 29, 31 and 32 are managed by a system administrator via a web-based graphical user interface 38. For this purpose, the system administrator can access the user interface 38, for example, via the management network 13.

Figure 3:
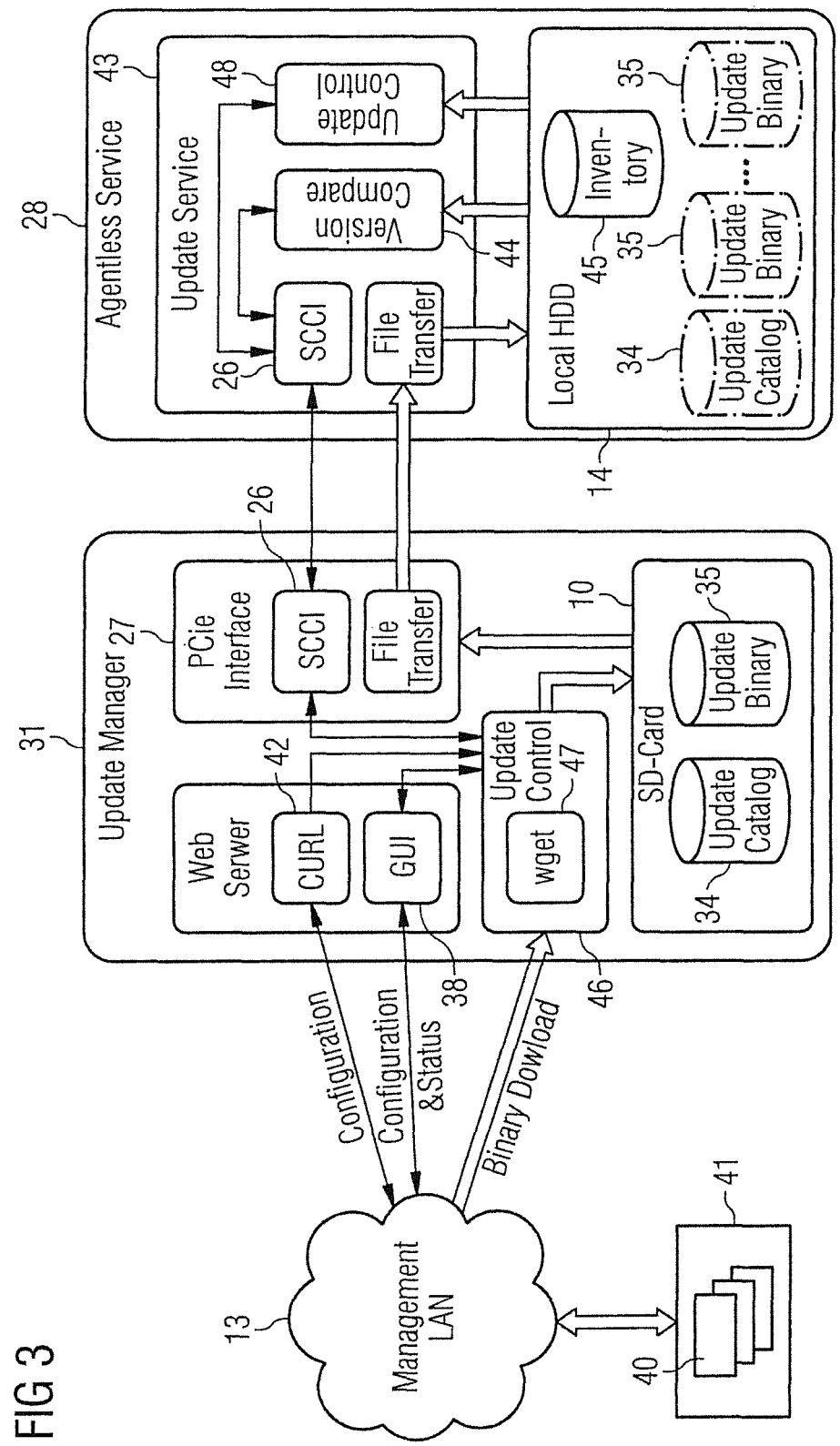
FIG. 3 shows a schematic illustration of the interaction between the service processor and an agent service.

A method of updating software components of the computer system 1 is described in detail below with reference to FIGS. 3 and 4. The method steps S1 to S4 and S8 to S12 described below can be carried out independently of the operation of the operating system 15, that is to say when the computer system 1 is switched on or off. This has the advantage, inter alia, that the effort associated with these steps does not influence the performance of the main processor 3. The remaining method steps S5 to S7 and S13 to S14 require cooperation between the service processor 4 and the agent service 28 running under the operating system 15. Therefore, the method is also referred to as "online update" below, in which case the term "online" relates to the active state of the host operating system 15.

In a first step S1, a request to carry out an update is detected. The request can be initiated manually, for example, by an administrator via the graphical user interface 38. Alternatively, it is also possible to initiate a time-controlled update of software components by a so-called scheduler. In the example, the service processor 4 is set up to start the method of updating software components at regular intervals of time, for example, once a day.

In a step S2, a first list in the form of a catalogue of available update packages 40 is first of all loaded during the described online update. The service processor 4 contacts a predetermined, so-called repository or update server 41 belonging to the manufacturer of the computer system 1 via a management network 13 for this purpose. Alternatively, another update server, for example, a local server inside a closed company network, which is predefined via a configuration interface 42 may also be selected. As one possibility, a catalogue file containing all update packages 40 available on the update server 41 is loaded in this step.

Alternatively, only update packages 40 for a given computer model or a given model series are loaded. For example, a product identifier allocated by the manufacturer of the computer system 1 and permanently stored in the service processor 4 can be transmitted, together with a request to download the catalogue of available update packages 40, to the update server 41 before step S2.

The catalogue or the list contained in the latter having available update packages 40 is stored in the first data volume 34 on the memory card 10. The data volume 34 is then offered as a storage medium of a virtual memory drive via the SCCI interface. For this purpose, the image contained in the data volume 34 is incorporated ("mounted"), via the virtual storage media library 23, in a part of the file system 33 to which the agent service 28 has access via the communication interface 26. The content of the data volume 34 therefore appears under the operating system 15 as a data storage medium which has been inserted into an internal CD or DVD drive and has appropriate content. For this purpose, a conventional USB driver which is contained, as standard, in most current operating systems such as Microsoft Windows or Linux is sufficient on the part of the operating system 15. Therefore, no further drivers need to be installed on the part of the operating system 15.

The method described above distinguishes between update packages 40 in a first group, relating to hardware components of the computer system 1, and update packages 40 in a second group, which relate to other software components of the computer system 1. An example of the first group are, in particular, so-called firmware updates including the BIOS 6 and the firmware of the service processor 4 itself. An example of the second group are update packages 40 which relate to application, operating system and driver components typically stored on the mass memory drive 14 and/or are executed under the control of the operating system 15.

A firmware component of the BIOS 6 or another firmware component is updated directly by the service processor 4. For this purpose, in step S3, the service processor first compares a version number of existing firmware components with a version number which has been transmitted as part of the catalogue for an available update package 40. If the update manager 31 determines in this case that an update is available for an existing firmware component, this is added to a second list of update packages 40 to be acquired in a step S4. Steps S3 and S4 are carried out for all firmware components of the computer system 1 and/or all meta data which are contained in the catalogue and relate to available update packages 40.

Before, after or in parallel with steps S3 and S4, an update service 43 of the agent service 28 checks the meta data in the second group of available update packages 40. For this purpose, it incorporates the virtual memory drive emulated by the service processor 4 in the environment of the operating system 15 in a step S5. It can accordingly access the image containing the catalogue and the first list, which image is stored in the data volume 34, and a conventional local data storage medium of the computer system 1 using a normal file system operation.

In a subsequent step S6, a version comparison component 44 uses a local configuration database 45 of the operating system 15 or other meta data to compare versions of software components installed on the computer system 1 with versions of the update packages 40 available according to the catalogue. If software components to be updated are identified in this case, the update service 43 signals this back to the update manager 31 of the service processor 4 by a function call. In a step S7, the update manager 31 then also adds those update packages 40 which have been identified by the version comparison component 44 to the second list of update packages 40 to be acquired.

In step S8, the actual updating of software components is initiated at a time which either immediately follows step S4 or S7 or, as explained above with respect to step S1, is manually determined by an administrator or a scheduling component ("scheduler").

For this purpose, the update packages 40 determined in steps S4 and S7 are stored in an update list in a step S9. In a subsequent step S10, an update controller 46 first of all acquires the associated update packages 40 in the first group from the update server 41. For this purpose, a loading component 47 processes the list created in step S9. This is the known utility wget in the example.

The affected firmware components of the computer system 1 are then updated in a step S11. The updating may take place directly under the control of the update manager 31 in a manner known per se by programming the associated memory modules with updated firmware or parts of the latter. Alternatively, it is also possible to update firmware components by the agent service 28 under the control of the operating system 15, as described below for the other software components in the second group.

In a step S12, at least the update packages 40 in the second group which relate to operating-system-dependent software components are downloaded by the service processor 4 and are stored on the memory card 10. In this case, the update packages 40 are stored in the image of the second data volume 35. The update packages 40 are preferably in the form of update packages which can be processed or executed by the update service 43 or the operating system 15. If the image of the data volume 35 has been successfully compiled, it is incorporated as described above and provided as the current storage medium of the virtual memory drive for the computer system 1. After corresponding signalling to the agent service 28, the latter therefore incorporates the second data volume in the operating system environment in step S13.

The update packages 40 contained in the image of the data volume 35 are then executed by the agent service 28 in step S14. In this case, software components of the operating system 15 stored on a hard disk 14, associated drivers or application programs, for example, are updated by an update component 48 of the update service 43 according to the update packages 40. The updating may take place in the background, that is to say as applications and services of the computer system 1 continue to run. If kernel components of the operating system 15 are affected by the update, the operating system 15 is possibly restarted by the agent service 28 or the service processor 4 after the updating has been concluded.

In another example, steps S2 to S7 are dispensed with entirely or partially. For example, the service processor 4 can use a type designation to determine all potentially relevant update packages 40 without cooperation with the agent service 28. Furthermore, detection of the installed components can also be carried out only once and the result can be stored at a suitable location, for example, in the inventory list 37. It is also possible for the existing components to be predefined manually by an administrator or automatically by the update server 41. In all of these cases, the update service 28 becomes active only when installing the update packages 40 in steps S13 and S14. In these cases, the update component 48 carries out a version comparison, possibly at the time of installation to prevent installation of incorrect updates.

Although our methods, computer systems and apparatus have been described in connection with specific forms thereof, it will be appreciated that a wide variety of equivalents may be substituted for the specified elements described herein without departing from the spirit and scope of this disclosure as described in the appended claims.

The invention claimed is:

1. A method of updating software components of a server computer system comprising:

downloading a plurality of update packages from at least one predetermined network source by a service processor of the server computer system, wherein the service processor is one of an intelligent remote management controller or a baseboard management controller, which can be operated independently of a main processor and an operating system of the server computer system to monitor correct operation of the server computer system and to carry out remote maintenance tasks independently of the main processor;

compiling the downloaded update packages to form a data volume;

establishing a data connection between an agent service executed under control of the operating system and the compiled data volume; and updating software components on the basis of the plurality of update packages in the compiled data volume by the agent service.

2. The method according to claim 1, wherein the downloading of the plurality of update packages comprises:

downloading a first list containing available update packages from an update server by the service processor, the first list containing meta data relating to the available update packages;

comparing the meta data contained in the first list to corresponding meta data relating to software components installed on the server computer system;

creating a second list containing software components which are contained in the server computer system and need to be updated, on the basis of the comparison; and downloading update packages according to the second list by the service processor.

3. The method according to claim 2, wherein the meta data containing at least one unique name of the software components, an item of version information relating to the software component and/or a date of the last update of the software component, and, in the downloading step, only those update packages which have a name matching one of the installed software components and/or whose version information or date of the last update indicates that they are more recent than a corresponding installed update package being downloaded.

4. The method according to claim 1, wherein the downloading of the plurality of update packages comprises:
determining software components installed on the server computer system;
creating a list of the software components determined, a first list containing meta data relating to the software components determined; and
downloading update packages from an update server on the basis of the created list containing the meta data.

5. The method according to claim 4, wherein the meta data containing at least one unique name of the software components, an item of version information relating to the software component and/or a date of the last update of the software component and, in the downloading step, only those update packages which have a name matching one of the installed software components and/or whose version information or date of the last update indicates that they are more recent than a corresponding installed update package being downloaded.

6. The method according to claim 1, wherein compiling the data volume comprises:
creating an image of a virtual storage medium in a memory connected to the service processor; and
incorporating the created image as a virtual memory drive in the operating system.

7. The method according to claim 1, wherein at least one of the downloading, compiling, establishing and updating steps are initiated by a scheduling component of the service processor.

8. The method according to claim 1, wherein application software components, operating system software components, driver software components and/or firmware components of the server computer system are updated in the updating step.

9. A server computer system comprising:
a main processor that executes an operating system and an agent service running in the operating system; and
a service processor that can be operated independently of the main processor and the operating system to monitor correct operation of the server computer system and to carry out remote maintenance tasks independently of the main processor, wherein
the service processor is one of an intelligent remote management controller or a baseboard management controller and is configured to load a plurality of update packages for the server computer system from at least one predetermined network source and compile them to form a data volume; and
the agent service is configured to establish a data connection to the compiled data volume and to update software components of the server computer system on the basis of the plurality of update packages in the compiled data volume.

10. The server computer system according to claim 9, further comprising at least one first memory apparatus that stores the operating system and at least one second memory apparatus that can be operated independently of the first memory apparatus, coupled to the service processor and configured to store the data volume.

11. The server computer system according to claim 10, wherein the service processor is configured to store an image of a storage medium in the second memory apparatus and provide the stored image as a storage medium for the operating system, which storage medium is inserted into a virtual memory drive.

12. The server computer system according to claim 11, wherein the service processor is configured to provide the stored image as a data storage medium of a virtual memory drive with a read-only operating mode of a CD or DVD drive.

13. The server computer system according to claim 10, wherein the second memory apparatus is in the form of a non-volatile mass memory, a flash memory module permanently connected to the server computer system or an exchangeable flash memory card.

14. The server computer system according to claim 9, wherein the service processor is configured to emulate a standard interface to access the data volume, with the result that the operating system can access the data volume without manufacturer-specific driver software.

15. The server computer system according to claim 9, wherein the service processor comprises a scheduling component configured to load the plurality of update packages for the server computer system according to at least one first predetermined schedule.

16. A non-transitory storage medium having executable program code stored thereon, at least the following steps being carried out by a service processor of a server computer system when the program code is being executed by the service processor, wherein the service processor is one of an intelligent remote management controller or a baseboard management controller and can be operated independently of a main processor and an operating system of the server computer system to monitor correct operation of the server computer system and to carry out remote maintenance tasks independently of the main processor:
downloading a plurality of update packages from at least one predetermined network source independently of a main processor and an operating system of the server computer system;
compiling the downloaded update packages to form a data volume; and
emulating a standard interface to access the data volume by an agent service running under the control of the operating system.

* * * * *